(12) United States Patent
Fujita et al.

(10) Patent No.: US 7,905,662 B2
(45) Date of Patent: Mar. 15, 2011

(54) CONNECTING DEVICE, CONNECTING SYSTEM, OPTICAL WAVEGUIDE AND CONNECTING METHOD

(75) Inventors: Kazuhiro Fujita, Tokyo (JP); Daisuke Watanabe, Tokyo (JP); Toshiyuki Okayasu, Tokyo (JP)

(73) Assignee: Advantest Corporation, Tokyo (JP)

( * ) Notice: Subject to any disclaimer, the term of this patent is extended or adjusted under 35 U.S.C. 154(b) by 93 days.

(21) Appl. No.: 12/099,167

(22) Filed: Apr. 8, 2008

(65) Prior Publication Data
US 2009/0103869 A1 Apr. 23, 2009

Related U.S. Application Data

(63) Continuation of application No. PCT/JP2006/316166, filed on Aug. 17, 2006.

(30) Foreign Application Priority Data

Oct. 21, 2005 (JP) ................................. 2005-307270

(51) Int. Cl.
  G02B 6/36 (2006.01)
  G02B 6/00 (2006.01)
  H01R 4/60 (2006.01)
(52) U.S. Cl. ................ 385/53; 385/88; 385/90; 385/94; 385/134; 439/197
(58) Field of Classification Search .............. 385/53–54, 385/76, 88–90, 92, 94, 134, 139; 439/197, 439/310, 259
See application file for complete search history.

(56) References Cited

U.S. PATENT DOCUMENTS

| 4,363,020 A | 12/1982 | Venema |
| 4,783,140 A * | 11/1988 | Osawa et al. ................ 385/123 |
| 6,619,858 B1 * | 9/2003 | Lytel et al. ...................... 385/89 |

FOREIGN PATENT DOCUMENTS

DE 1076230 A 2/1960

(Continued)

OTHER PUBLICATIONS

Article Titled "Architecture of a Terabit Free-Space Photonic Backplane" jointly authored by Szymanski et al., in The International Conference on Optical Computing Technical Digest, Oct. 1994 (pp. 141-144).

(Continued)

*Primary Examiner* — Mark A Robinson
*Assistant Examiner* — Michael P Mooney
(74) *Attorney, Agent, or Firm* — Osha • Liang LLP

(57) ABSTRACT

There is provided a connecting system including a connecting apparatus that includes (i) a signal transfer path that transfers one of an electrical signal and an optical signal and (ii) a connecting device that connects the signal transfer path to a connection target component in such a manner that a signal is capable of being transferred therebetween, and a connected apparatus that includes the connection target component to be connected to the signal transfer path. Here, the connecting device includes a moving portion that has therein a sealed space. The moving portion moves an end portion of the signal transfer path closer to the connection target component so that the end portion of the signal transfer path is connected to the connection target component in response to an increase in a pressure within the moving portion, and moves the end portion away from the connection target component in response to a decrease in the pressure within the moving portion.

20 Claims, 12 Drawing Sheets

FOREIGN PATENT DOCUMENTS

| | | |
|---|---|---|
| DE | 3150864 C2 | 7/1982 |
| JP | 58-104968 * | 7/1983 |
| JP | 60-176407 | 11/1985 |
| JP | 01-210904 | 8/1989 |
| JP | 2001-300207 | 12/1989 |
| JP | 09-044272 | 2/1997 |
| JP | 3071853 | 7/2000 |
| JP | 2001-033636 | 2/2001 |
| JP | 2002-72029 | 3/2002 |
| JP | 2003-00529 | 1/2003 |

OTHER PUBLICATIONS

Office Action for German Application No. 11 2006 002 858.8-51 mailed on Aug. 6, 2010 and English translation thereof, 7 pages.

* cited by examiner

CONNECTING DEVICE, CONNECTING SYSTEM, OPTICAL WAVEGUIDE AND CONNECTING METHOD

CROSS REFERENCE TO RELATED APPLICATION

This is a continuation application of PCT/JP2006/316166 filed on Aug. 17, 2006 which claims priority from a Japanese Patent Application No. 2005-307270 filed on Oct. 21, 2005, the contents of which are incorporated herein by reference.

BACKGROUND

1. Technical Field

The present invention relates to a connecting device, a connecting system, an optical waveguide and a connecting method. More particularly, the present invention relates to a connecting device, a connecting system, an optical waveguide and a connecting method for connecting electrical circuit substrates to each other in such a manner that signal transfer is possible between the electrical circuit substrates.

2. Related Art

A technique has been proposed to signal-connect together two electrical circuit substrates which are parallel to each other based on optical space transmission. For example, refer to Japanese Patent Application Publication No. 09-44272 and T. Szymanski and H. S. Hintor, "Architecture of a Terabit Free-space photonic backplane", The international conference on optical computing technical digest, October 1994. According to the proposed optical space transmission technique, the signal is transferred without going through any backplanes. Therefore, the two electrical circuit substrates can be efficiently connected to each other.

However, the above-mentioned technique has problems. In order that optical transmission is realized between the two substrates, the substrates need to be highly accurately positioned to prevent misalignment between a light emitting section and a light receiving section. Furthermore, when a large number of optical transfer paths are created, light leakage may cause interference, which may degrade the communication quality. Additionally, when optical transmission is realized between the two substrates, the light emitting section and the light receiving section remain externally exposed. Therefore, dirt and dust may attach to the light emitting section and the light receiving section, and the communication quality may accordingly deteriorate.

SUMMARY

Therefore, it is an object of an aspect of the innovations herein to provide a connecting device, a connecting system, an optical waveguide, and a connecting method which are capable of overcoming the above drawbacks accompanying the related art. The above and other objects can be achieved by combinations described in the independent claims. The dependent claims define further advantageous and exemplary combinations of the innovations herein.

According to the first aspect related to the innovations herein, one exemplary connecting device may include a connecting device for connecting a signal transfer path to a connection target component in such a manner that a signal is capable of being transferred therebetween. The connecting device includes the signal transfer path that is to be connected to the connection target component, and a moving portion that has therein a sealed space. Here, the moving portion moves an end portion of the signal transfer path closer to the connection target component so that the end portion is connected to the connection target component with signal transfer being possible therebetween in response to an increase in a pressure in the moving portion, and moves the end portion away from the connection target component in response to a decrease in the pressure in the moving portion.

The moving portion may hold, within the sealed space, a portion of the signal transfer path which has a predetermined length and contains the end portion of the signal transfer path. The moving portion may move the end portion of the signal transfer path in a direction towards the connection target component, by expanding or contracting in response to the pressure within the moving portion. The moving portion may be hollow and shaped like an accordion.

The signal transfer path may be an optical waveguide, and the moving portion may move the end portion of the optical waveguide closer to the connection target component in response to the increase in the pressure within the moving portion, so that the end portion of the optical waveguide and the connection target component are optically connected to each other without a contact therebetween. The signal transfer path may be an optical waveguide, and the moving portion may move the end portion of the optical waveguide closer to the connection target component in response to the increase in the pressure within the moving portion, so that the end portion of the optical waveguide and the connection target component are optically connected to each other by using a connector.

The connecting device may include a multicore cable that is formed by clustering together a plurality of optical waveguides by using a stretchable material. Here, the moving portion may move one or more of a plurality of end portions of the plurality of optical waveguides in the multicore cable in a direction towards the connection target component. The optical waveguide may be formed by using a stretchable material, and the moving portion may move the end portion of the optical waveguide closer to the connection target component by expanding the optical waveguide, in order that the end portion is connected to the connection target component.

The connecting device may further include an alignment portion that (i), when the end portion of the signal transfer path is moved closer to the connection target component, comes in contact with a guide member provided on an apparatus including therein the connection target component before the signal transfer path is connected to the connection target component, and (ii), as the end portion of the signal transfer path is further moved closer to the connection target component, is guided by the guide member, thereby reducing misalignment of the end portion of the signal transfer path on a plane perpendicular to a direction in which the end portion of the signal transfer path is moved closer to or away from the connection target component.

The moving portion may be configured so as to connect a plurality of signal transfer paths running in parallel to each other with a plurality of connection target components in a one-to-one correspondence. The connecting device may further include an angle adjusting portion that (i), when end portions of the plurality of signal transfer paths are moved closer to the plurality of connection target components, comes in contact with a guide member that is provided on an apparatus including therein the plurality of connection target components before the plurality of signal transfer paths are connected to the plurality of connection target components in a one-to-one correspondence and (ii), as the end portions of the plurality of signal transfer paths are further moved closer to the plurality of connection target components, is guided by the guide member, thereby reducing angular misalignment of the end portions of the plurality of signal transfer paths on a plane perpendicular to a direction in which the end portions of the plurality of signal transfer paths are moved closer to or away from the plurality of connection target components.

The connecting device may further include a fixing portion that maintains the signal transfer path and the connection target component connected to each other, while the pressure inside the moving portion is reduced after the signal transfer path is connected to the connection target component. The moving portion may include a cleaning portion that cleans a connection portion of the connection target component by expelling a gas inside the moving portion to the connection target component while the pressure inside the moving portion is higher than an outside pressure in order to move the end portion of the signal transfer path closer to the connection target component.

According to the second aspect related to the innovations herein, one exemplary connecting system may include a connecting system including a connecting apparatus that includes (i) a signal transfer path that transfers one of an electrical signal and an optical signal and (ii) a connecting device that connects the signal transfer path to a connection target component in such a manner that a signal is capable of being transferred therebetween, and a connected apparatus that includes the connection target component to be connected to the signal transfer path. Here, the connecting device includes a moving portion that has therein a sealed space. The moving portion moves an end portion of the signal transfer path closer to the connection target component so that the end portion of the signal transfer path is connected to the connection target component in response to an increase in a pressure within the moving portion, and moves the end portion away from the connection target component in response to a decrease in the pressure within the moving portion.

The connecting apparatus and the connected apparatus may be circuit boards having electric circuits formed therein, and the circuit boards may be mounted on the connecting system in parallel to each other. The moving portion may move the end portion of the signal transfer path closer to one of the circuit boards which corresponds to the connected apparatus by moving the end portion of the signal transfer path in a direction perpendicular to the circuit boards in response to the increase in the pressure within the moving portion, so as to connect the end portion of the signal transfer path to the connection target component in such a manner that a signal is capable of being transferred therebetween. The connecting system may further include a backplane that includes a first backplane (BP) connector and a second BP connector, where the first BP connector is to be connected to a board connector provided on a side of one of the circuit boards which corresponds to the connecting apparatus, and the second BP connector is to be connected to a board connector provided on a side of one of the circuit boards which corresponds to the connected apparatus. Here, the backplane may supply a gas supplied thereto from a source outside the connecting system, to the moving portion included in one of the circuit boards which corresponds to the connecting apparatus, via the first BP connector. The connecting system may further include a pressure control section that controls the pressure within the moving portion.

According to the third aspect related to the innovations herein, one exemplary optical waveguide may include an optical waveguide that is formed by using a stretchable material which transmits light therethrough. Here, the optical waveguide is to be used in a state of being expanded in a longitudinal direction thereof.

According to the fourth aspect related to the innovations herein, one exemplary connecting method may include a connecting method for connecting a signal transfer path to a connection target component in such a manner that a signal is capable of being transferred therebetween. The connecting method includes moving an end portion of the signal transfer path closer to the connection target component so that the end portion of the signal transfer path is connected to the connection target component by increasing a pressure within a moving portion that has therein a sealed space, and moving the end portion away from the connection target component by decreasing the pressure within the moving portion.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, an embodiment of the present invention will be described. The embodiment does not limit the invention according to the claims, and all the combinations of the features described in the embodiment are not necessarily essential to means provided by aspects of the invention.

Figure 1:
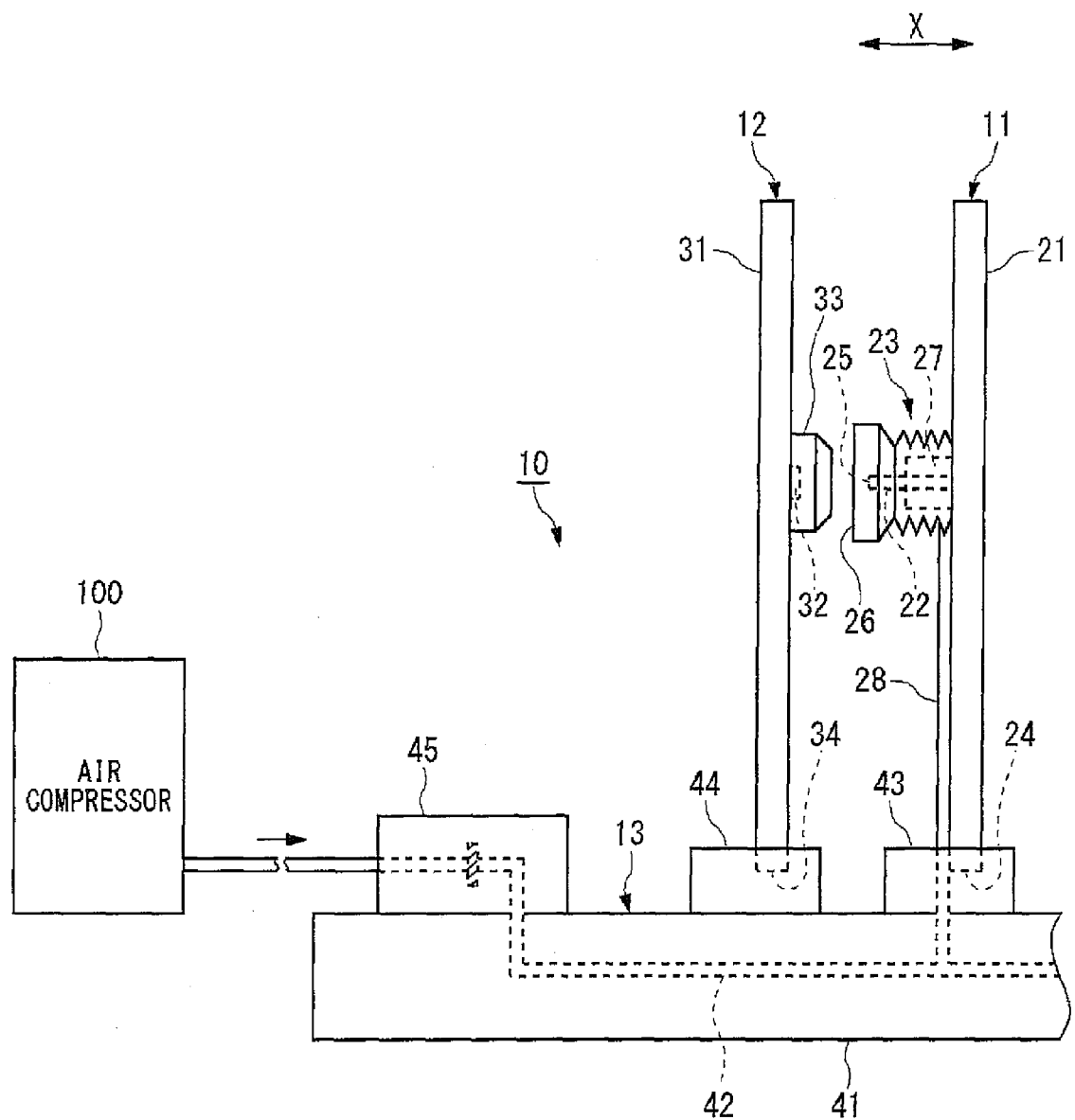
FIG. 1 illustrates a board connecting system 10 in such a state that circuit boards are connected to each other.
Figure 2:
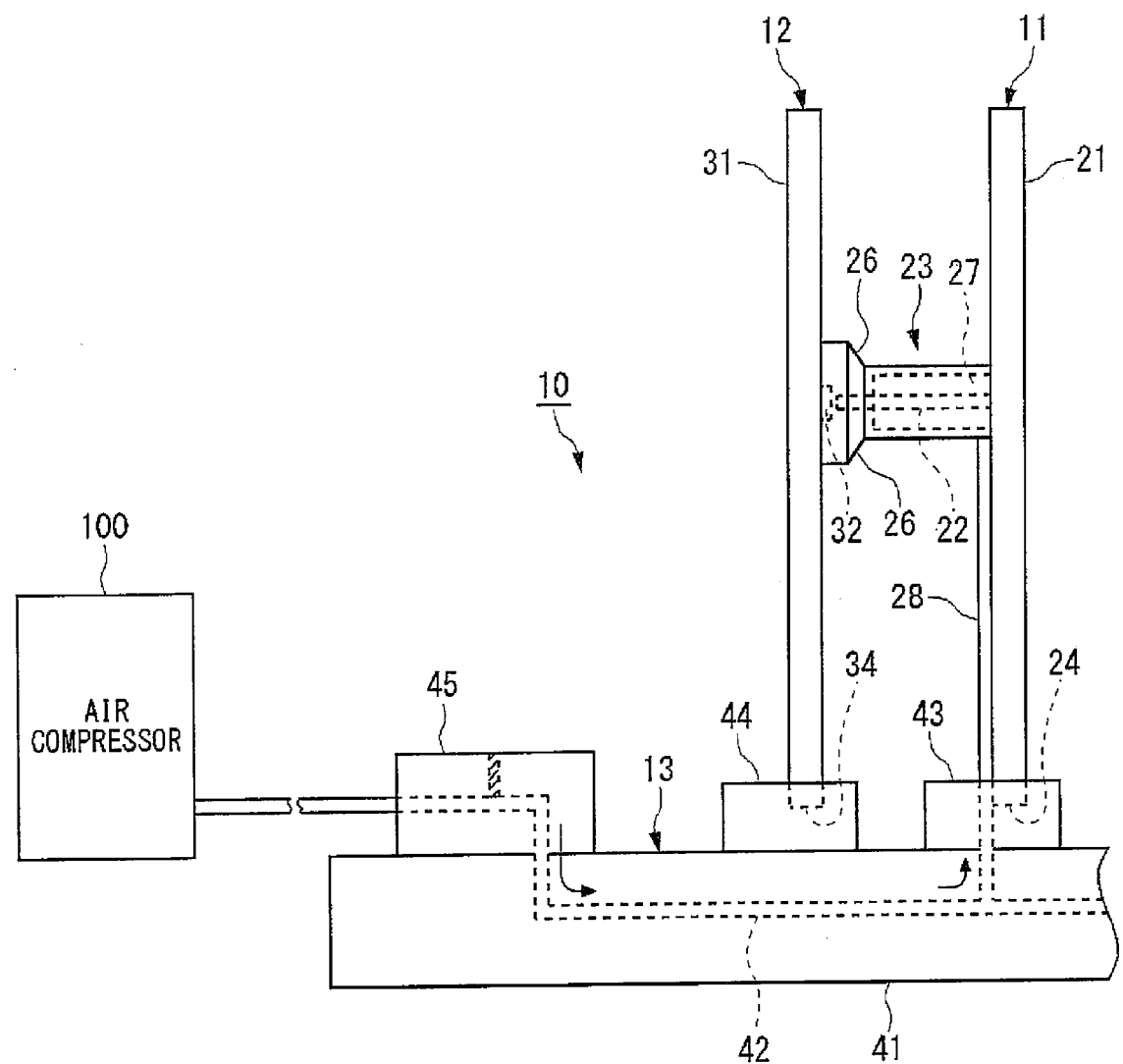
FIG. 2 illustrates the board connecting system 10 in such a state that the circuit boards are not connected to each other.

FIG. 1 illustrates a board connecting system 10 in such a state that the circuit boards are not connected to each other. FIG. 2 illustrates the board connecting system 10 in such a state that the circuit boards are connected to each other.

The board connecting system 10 includes a connecting circuit board 11, a connected circuit board 12, and a backplane 13.

The board connecting system 10 holds the connecting circuit board 11 and the connected circuit board 12 in parallel to each other. Additionally, the board connecting system 10 signal-connect the connecting circuit board 11 and the connected circuit board 12 to each other without using a connector, thereby achieving efficient signal transfer. The board connecting system 10 is utilized to signal-connect test modules to each other, which are inserted into the test head of a semiconductor test apparatus and kept parallel to each other, for example.

The connecting circuit board 11 is a circuit board in which an electrical circuit is provided, and is shown as an example of a connecting device relating to the present invention. The connecting circuit board 11 includes a first circuit substrate 21, optical waveguides 22 and a connecting device 23. The first circuit substrate 21 has a circuit pattern or the like formed therein, and has an electronic component mounted therein. On a predetermined side of the first circuit substrate 21, a first board connector 24 is formed.

Each optical waveguide 22 is shown as an example of a signal transfer path relating to the present invention, and is an optical fiber or the like which transmits an optical signal. The optical waveguides 22 may be replaced with transfer paths for an electrical signal. One end of each optical waveguide 22 is attached to the first circuit substrate 21, and optically connected to a light receiving element and/or a light emitting element. The other end of each optical waveguide 22 is shown as an example of an end portion of the signal transfer path relating to the present invention. The other end of each optical waveguide 22 is physically released from the first circuit substrate 21. The other end of each optical waveguide 22 is referred to as an open end portion 25. Here, the length of each optical waveguide 22 from its root portion connected to the first circuit substrate 21 to its open end portion 25 may be determined in advance.

The connecting device 23 connects the optical waveguides 22 to connection target components included in the connected circuit board 12 in such a manner that signals can be transferred between the connection target components and the optical waveguides 22. The connecting device 23 includes a moving portion 26 having therein a sealed internal space 27, and an air inlet tube 28.

The moving portion 26 is attached to the surface of the first circuit substrate 21. The moving portion 26 is expandable and contractible in a direction substantially perpendicular to the surface of the first circuit substrate 21 by the pressure of the gas sealed in the internal space 27 (the air pressure). Specifically speaking, the moving portion 26 expands in the direction perpendicular to the first circuit substrate 21 when the air pressure inside the internal space 27 increases, and contracts in the direction perpendicular to the first circuit substrate 21 when the air pressure inside the internal space 27 decreases. In the following description, the direction perpendicular to the surface of the first circuit substrate 21 is referred to as an X direction.

The moving portion 26 holds the open end portions 25 of the optical waveguides 22, and houses the optical waveguides 22 within the internal space 27. Hence, when expanded, the moving portion 26 moves the open end portions 25 of the optical waveguides 22 away from the first circuit substrate 21. When contracted, the moving portion 26 moves the open end portions 25 of the optical waveguides 22 closer to the first circuit substrate 21. Alternatively, the moving portion 26 may not house the optical waveguides 22 in the internal space 27, and move the open end portions 25 of the optical waveguides 22 which are positioned outside the internal space 27.

The air inlet tube 28 is provided on the first circuit substrate 21. One end of the air inlet tube 28 is connected to the internal space 27 of the moving portion 26, and the other end of the air inlet tube 28 is positioned at substantially the same position as the first board connector 24. The air inlet tube 28 introduces, to the internal space 27, compressed air supplied from outside. The provision of the air inlet tube 28 enables the moving portion 26 to expand and contract.

The connected circuit board 12 is a circuit board in which an electrical circuit is disposed, and shown as an example of a connected device relating to the present invention. The connected circuit board 12 includes a second circuit substrate 31, light receiving and emitting elements 32, and a guide member 33.

The second circuit substrate 31 has a circuit pattern or the like formed therein, and has an electronic component mounted therein. On a predetermined side of the second circuit substrate 31, a second board connector 34 is formed. Each light receiving and emitting element 32 is shown as an example of the connection target component relating to the present invention, and configured to receive, emit, or receive and emit an optical signal. The light receiving and emitting elements 32 are provided on the surface of the second circuit substrate 31 with their light receiving and emitting portions being exposed externally on the surface. The guide member 33 is attached to the second circuit substrate 31. The guide member 33 guides the moving portion 26 to a predetermined position, when the moving portion 26 moves.

The backplane 13 keeps the connecting circuit board 11 and the connected circuit board 12 parallel to each other, and controls the air pressure inside the internal space 27 of the moving portion 26. The backplane 13 has a base member 41, an air supply path 42, a first backplane (BP) connector 43, a second backplane (BP) connector 44 and a pressure control section 45.

The base member 41 is a substrate in which the air supply path 42, the first BP connector 43, the second BP connector 44, and the pressure control section 45 are provided. The air supply path 42 is an air flow channel formed within the base member 41. The air supply path 42 receives, through its inlet, compressed air which is output from an air compressor 100 provided outside the board connecting system 10. The outlet of the air supply path 42 for the compressed air is provided at the first BP connector 43. When there are a plurality of first BP connectors 43, the air flow channel branches into a plurality of sub-channels in the base member 41, and the outlets of the sub-channels are respectively provided at the first BP connectors 43.

The first and second BP connectors 43 and 44 are provided on the surface of the base member 41. Into the first BP connector 43, the first board connector 24, which is formed on the predetermined side of the connecting circuit board 11, is inserted. Into the second BP connector 44, the second board connector 34, which is formed on the predetermined side of the connected circuit board 12, is inserted. The first and second BP connectors 43 and 44 respectively keep the connecting circuit board 11 and the connected circuit board 12 perpendicular to the base member 41. Therefore, the connecting circuit board 11 and the connected circuit board 12 are mounted on the board connecting system 10 in such a manner as to be parallel to each other.

When the connecting circuit board 11 is connected to the first BP connector 43, the first BP connector 43 connects the end portion of the air inlet tube 28 which is positioned in the vicinity of the first board connector 24 to the compressed air outlet of the air supply path 42. This enables the backplane 13 to supply the compressed air supplied from the air compressor 100 to the internal space 27 in the moving portion 26 via the air supply path 42 and the air inlet tube 28.

The pressure control section 45 controls whether to close or open the flow channel or the like which is formed by the air supply path 42, so as to control the air pressure within the internal space 27 of the moving portion 26. Specifically speaking, in order to increase the air pressure within the internal space 27, the pressure control section 45 opens the flow channel formed by the air supply path 42 so as to supply the compressed air supplied from the air compressor 100 into the internal space 27. On the other hand, in order to decrease the air pressure within the internal space 27, the pressure control section 45 closes the flow channel formed by the air supply path 42 so as to prevent the compressed air supplied from the air compressor 100 from being supplied into the internal space 27.

When the optical waveguides 22 are expanded in the X direction in the board connecting system 10 described above, the optical waveguides 22 included in the connecting circuit board 11 are positioned so as to oppose the light receiving and emitting elements 32 included in the connected circuit board 12, so that an optical signal can be transferred between the open end portions 25 of the optical waveguides 22 and the light receiving and emitting elements 32.

When the air pressure in the internal space 27 of the moving portion 26 increases, the moving portion 26 is expanded in the X direction as illustrated in FIG. 2. Accordingly, the open end portions 25 of the optical waveguides 22 become closer to the light receiving and emitting sections 32. As a result of such movement, the connecting circuit board 11 and the connected circuit board 12 are signal-connected to each other. On the other hand, when the air pressure in the internal space 27 of the moving portion 26 decreases, the moving portion 26 is contracted in the X direction as illustrated in FIG. 1. Accordingly, the open end portions 25 of the optical waveguides 22 move away from the light receiving and emitting elements 32. As a result of such movement, the signal connection between the connecting circuit board 11 and the connected circuit board 12 is cut off.

According to the above-described board connecting system 10, the open end portions 25 of the optical waveguides 22 are moved by the moving portion 26 which is expandable and contractible in accordance with the air pressure in the internal space 27. Therefore, the board connecting system 10 can connect together, via an optical signal, the connecting circuit board 11 and the connected circuit board 12 which are kept parallel to each other, without the optical signal going through the backplane 13.

Figure 3:
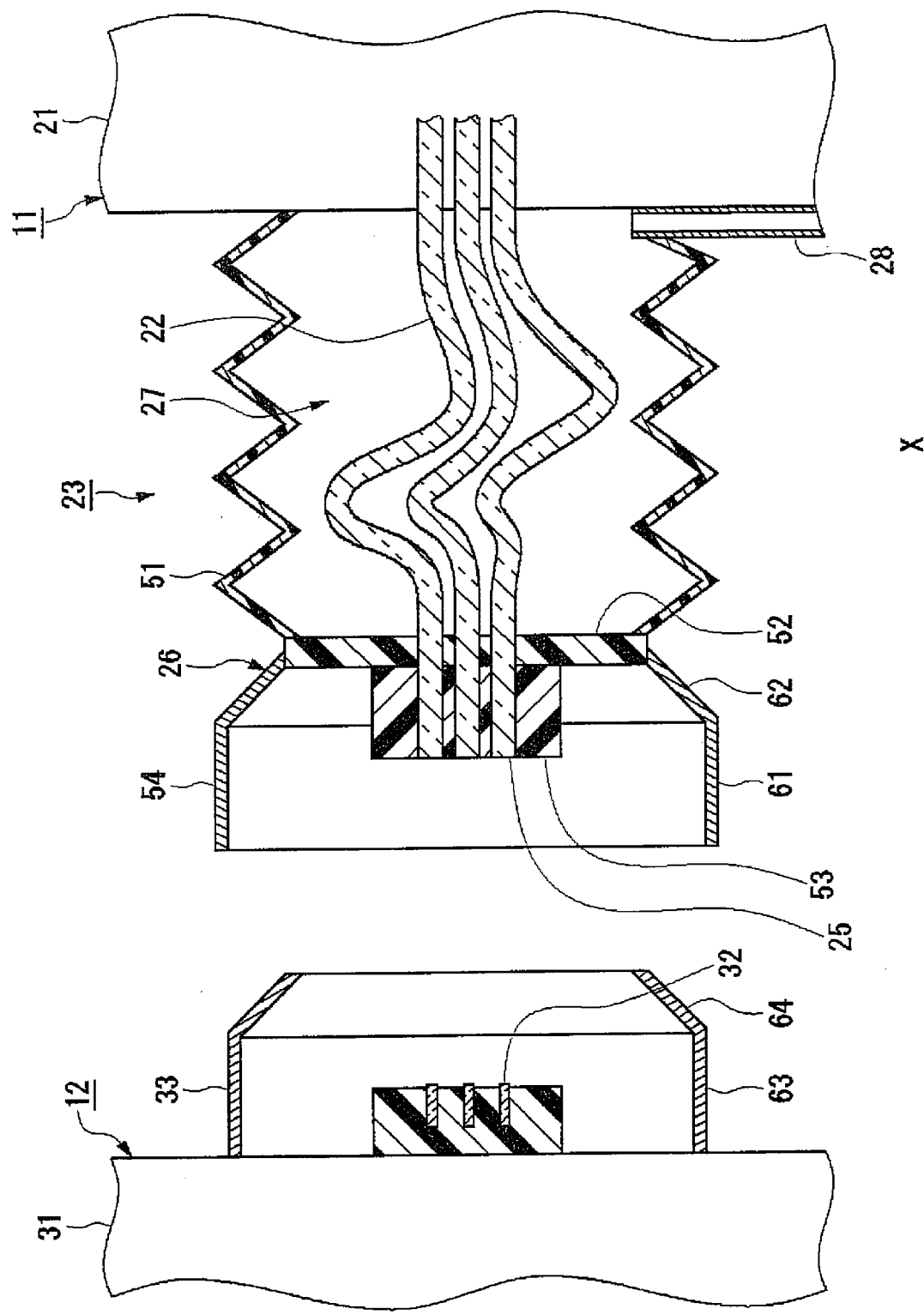
FIG. 3 illustrates a connecting device 23 in such a state that a moving portion 26 is contracted, and the cross-sections of optical waveguides 22, light receiving and emitting elements 32, and a guide member 33.
Figure 4:
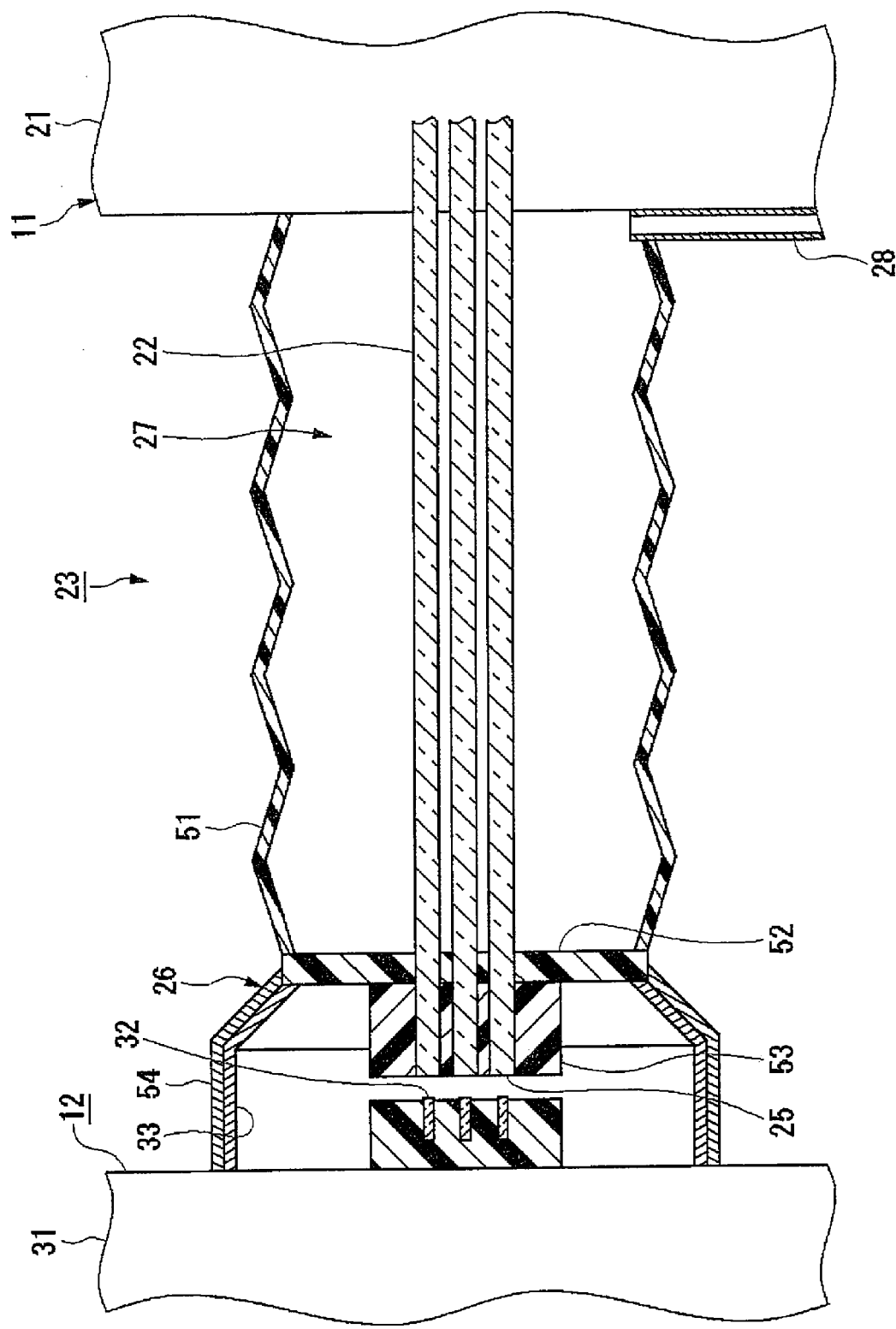
FIG. 4 illustrates the connecting device 23 in such a state that the moving portion 26 is expanded, and the cross-sections of the optical waveguides 22, the light receiving and emitting elements 32, and the guide member 33.

FIG. 3 illustrates the cross-section of the connecting device 23 in such a state that the moving portion 26 is contracted. FIG. 3 also illustrates the cross-sections of the optical waveguides 22, the light receiving and emitting elements 32, and the guide member 33. FIG. 4 illustrates the cross-section of the connecting device 23 in such a state that the moving portion 26 is expanded. FIG. 4 also illustrates the cross-sections of the optical waveguides 22, the light receiving and emitting elements 32, and the guide member 33.

The moving portion 26 has an accordion-like portion 51, a bottom portion 52, a support portion 53 and an alignment portion 54.

The accordion-like portion 51 is a hollow cylinder with an accordion-like cylindrical surface. The accordion-like cylindrical surface enables the according-like portion 51 to expand and contract in the direction parallel to the axis of the cylinder. The accordion-like portion 51 is attached at one end thereof to the surface of the first circuit substrate 21 in such a manner that the optical waveguides 22 are housed within the accordion-like portion 51 and that the axis of the cylinder is parallel to the X direction.

The bottom portion 52 is shaped like a circular board, for example. The bottom portion 52 is attached to the end portion of the accordion-like portion 51 which faces away from the first circuit substrate 21, so as to tightly seal the accordion-like portion 51. The bottom portion 52 has through holes formed at substantially the center thereof. Here, the optical waveguides 22 penetrate the bottom portion 52 through the through holes, so that a portion of each optical waveguide 22 which contains the open end portion 25 is positioned outside the accordion-like portion 51.

The support portion 53 is configured so as to fix, to the bottom portion 52, the portion of each optical waveguide 22 which is positioned outside the accordion-like portion 51 with respect to the bottom portion 52. Therefore, as the accordion-like portion 51 expands/contracts, the open end portions 25 of the optical waveguides 22 move in the X direction. The support portion 53 supports the outer portions of the optical waveguides 22 in such a manner that the end surfaces of the open end portions 25 remain perpendicular to the X direction. In this manner, the open end portions 25 of the optical waveguides 22 can receive optical signals parallel to the X direction, and emit optical signals in the X direction.

The alignment portion 54 is guided by the guide member 33 when the moving portion 26 expands, so that the open end portions 25 of the optical waveguides 22 are positioned so as to be capable of emitting/receiving optical signals to/from the light receiving and emitting sections 32.

Specifically speaking, the alignment portion 54 has a first cylindrical portion 61 and a first taper portion 62. The first cylindrical portion 61 has a diameter slightly larger than the diameter of the accordion-like portion 51. The first taper portion 62 is shaped like a cylinder whose diameter gradually decreases. Here, the end portion of the first taper portion 62 which has a larger diameter than the other end portion is connected to the first cylindrical portion 61, and the diameter of the first taper portion 62 decreases as the first taper portion 62 moves away from the first cylindrical portion 61. The alignment portion 54 is attached to the bottom portion 52 in such a manner that the end portion of the first taper portion 62 which has a smaller diameter than the other end portion comes in contact with the bottom portion 52 and that the central axis of the cylindrical portion coincides with the central axis of the accordion-like portion 51. Here, the guide member 33 is shaped so as to fit in and become engaged with the alignment portion 54. To be specific, the guide member 33 has a second cylindrical portion 63 and a second taper portion 64, similarly to the alignment portion 54. As a whole, the guide member 33 has the same shape as the alignment portion 54. The outside dimensions of the guide member 33 are the same as the inside dimensions of the alignment portion 54. The guide member 33 has the light receiving and emitting elements 32 arranged at its center. Additionally, the guide member 33 is attached to the surface of the second circuit substrate 31 in such a manner that the end portion of the first cylindrical portion 61 comes in contact with the surface of the second circuit substrate 31 and that the central axis of the guide member 33 coincides with the central axis of the alignment portion 54.

Referring to the moving portion 26 described above, the accordion-like portion 51, the bottom portion 52, and the first circuit substrate 21 together form the internal space 27 which is sealed and houses therein the optical waveguides 22. The internal space 27 formed in this manner is supplied with the compressed air transmitted through the air inlet tube 28. As the air pressure in the internal space 27 is decreased, the accordion-like portion 51 contracts as illustrated in FIG. 3. As a result, the open end portions 25 of the optical waveguides 22 move away from the light receiving and emitting elements 32, so that the transfer paths of the optical signals are cut off. On the other hand, as the air pressure in the internal space 27 is increased, the accordion-like portion 51 expands as illustrated in FIG. 4. As a result, the open end portions 25 of the optical waveguides 22 move closer to the light receiving and emitting elements 32, so that the transfer paths of the optical signals are established.

Referring to the connecting device 23, when the open end portions 25 move closer to the light receiving and emitting elements 32 as a result of the expansion of the moving portion 26, the internal surface of the first cylindrical portion 61 comes in contact with the external surface of the second taper portion 64, before the optical waveguides 22 become connected to the light receiving and emitting elements 32. As the open end portions 25 move further closer to the light receiving and emitting elements 32, the alignment portion 54 is guided by the tilted surface of the second taper portion 64. Ultimately, the alignment portion 54 is engaged with the guide member 33. With this engagement, the connecting device 23 reduces the misalignment between the open end portions 25 and the light receiving and emitting elements 32 on the plane perpendicular to the X direction, which may be caused when the open end portions 25 are moved closer to the light receiving and emitting elements 32.

Here, the guide member 33 and the alignment portion 54, which are designed to reduce the misalignment between the open end portions 25 and the light receiving and emitting elements 32 on the plane perpendicular to the X direction, may be a pin provided so that its longitudinal direction extends in the X direction and a member which guides the pin, for example.

Referring to the connecting device 23, the length of each optical waveguide 22, the position of each light receiving and emitting element 32 and other variables are determined in such a manner that, when the open end portions 25 of the optical waveguides 22 and the light receiving and emitting elements 32 are signal-connected to each other as a result of the expansion of the moving portion 26, there is a minute space formed between the open end portions 25 and the light receiving and emitting elements 32. Which is to say, the light receiving and emitting elements 32 and the open end portions 25 of the optical waveguides 22 are optically connected to each other without contacting each other. Consider a case where there is slight vertical misalignment between the open end portions 25 and the light receiving and emitting elements 32. In this case, light can not be transferred between the open end portions 25 and the light receiving and emitting elements 32 if the open end portions 25 and the light receiving and emitting elements 32 physically contact with each other. On the contrary, light can be transferred between the open end portions 25 and the light receiving and emitting elements 32 if a slight space is formed between the open end portions 25 and the light receiving and emitting elements 32.

Alternatively, the open end portions 25 of the optical waveguides 22 and the light receiving and emitting elements 32 may be directly connected to each other by using a connecter, without a slight space being formed between the open end portions 25 and the light receiving and emitting elements 32. This configuration prevents the misalignment.

Figure 5:
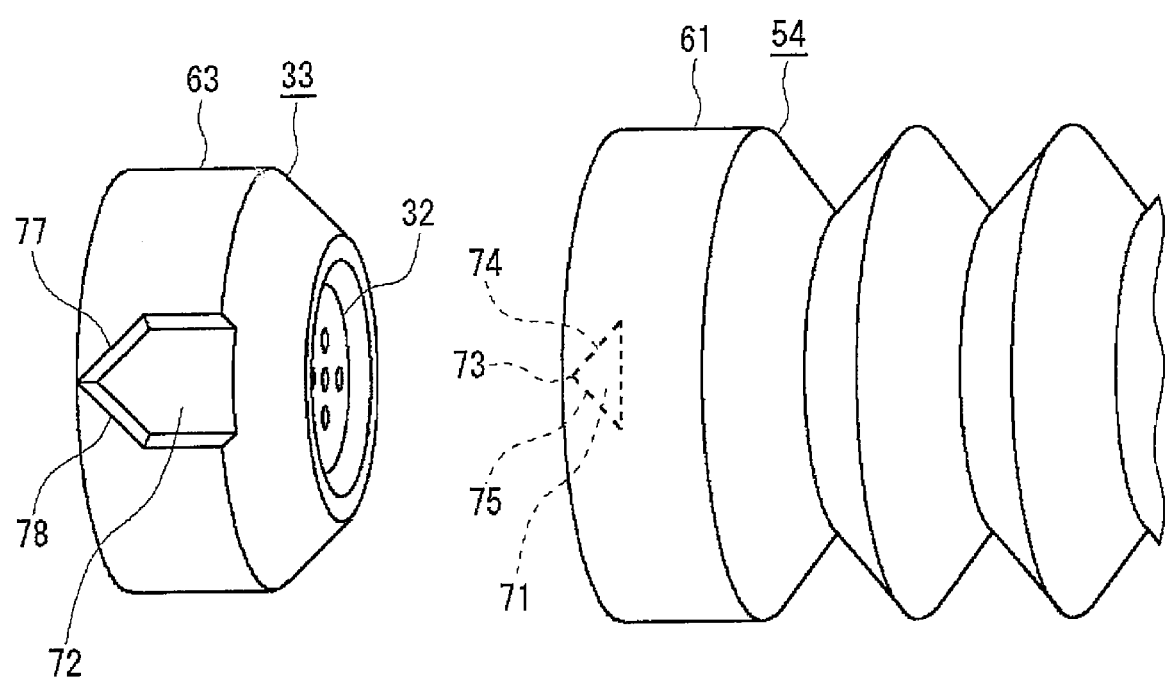
FIG. 5 is a perspective view illustrating an angle adjusting portion 71 provided in an alignment portion 54 and a guide groove 72 provided in the guide member 33.
Figure 6:
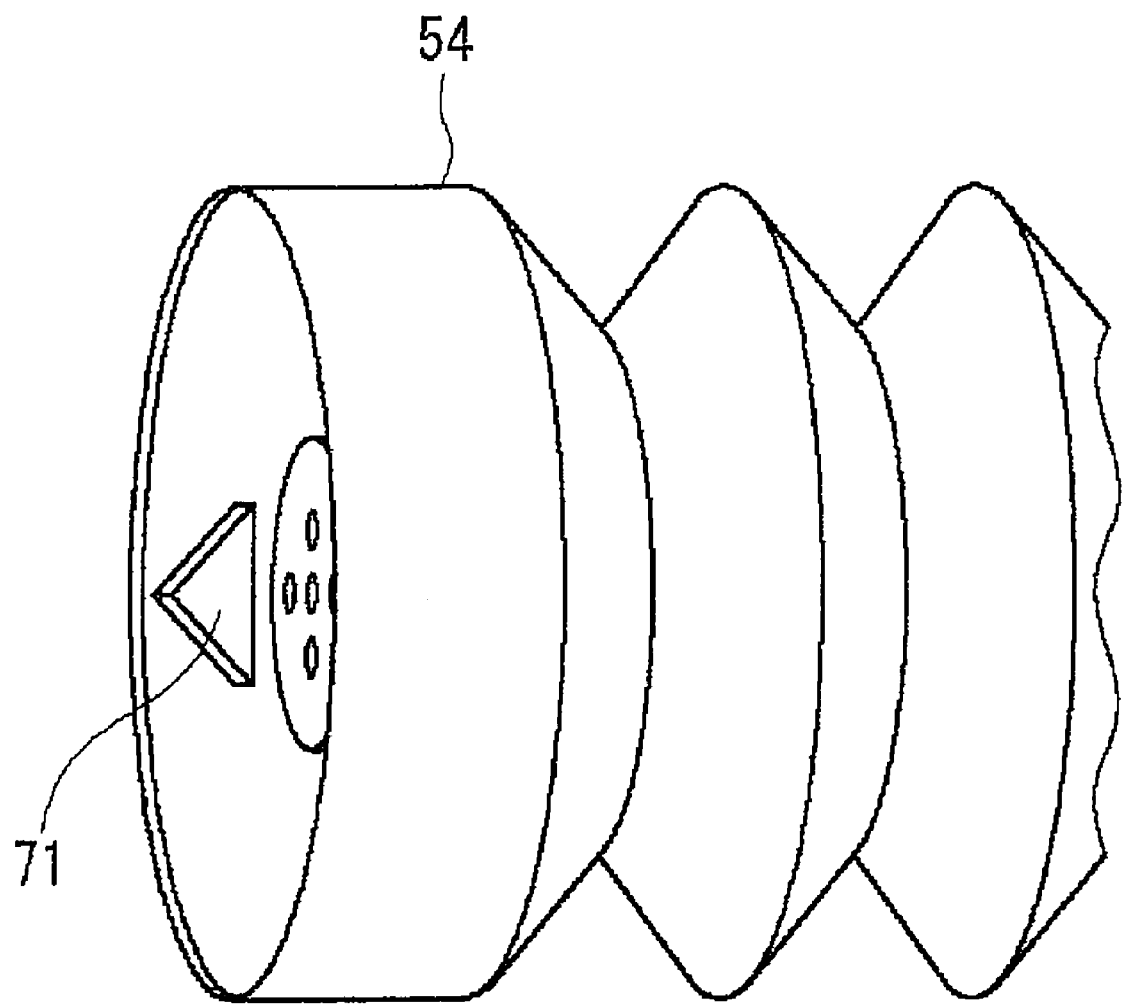
FIG. 6 is a perspective view illustrating the angle adjusting portion 71 provided in the alignment portion 54, which is seen from a different direction than in FIG. 5.

FIG. 5 is a perspective view illustrating an angle adjusting portion 71 provided in the alignment portion 54 and a guide groove 72 provided in the guide member 33. FIG. 6 is a perspective view illustrating the angle adjusting portion 71 provided in the alignment portion 54, which is seen from a different direction than in FIG. 5.

Referring to the board connecting system 10, the guide groove 72 and the angle adjusting portion 71 may be respectively provided in the guide member 33 and the alignment portion 54, when the optical waveguides 22 running in parallel are connected to the plurality of light receiving and emitting elements 32 in a one-to-one correspondence.

The angle adjusting portion 71 is, for example, a projection formed in the internal wall of the first cylindrical portion 61 of the alignment portion 54. The angle adjusting portion 71 has a planar shape of a triangle, and a vertex 73 of the triangle points to the light receiving and emitting elements 32, for example.

The guide groove 72 is, for example, a groove portion formed in the external wall of the second cylindrical portion 63 of the guide member 33. The depth and planar shape of the guide groove 72 are determined in correspondence with the thickness and planar shape of the angle adjusting portion 71, in order that the mechanical interference between the angle adjusting portion 71 and the guide member 33 does not obstruct the expansion of the moving portion 26. The guide groove 72 has a first taper side 77 and a second taper side 78. When the moving portion 26 is completely expanded to such a degree that the alignment portion 54 is perfectly engaged with the guide member 33, the first and second taper sides 77 and 78 of the guide groove 72 come in contact with a first side 74 and a second side 75 of the angle adjusting portion 71 which meet at the vertex 73 of the triangle.

The board connecting system 10 is provided with the above-described guide groove 72 and the angle adjusting portion 71. Therefore, as the open end portions 25 of the optical waveguides 22 move closer to the light receiving and emitting elements 32, the first side 74 or second side 75 of the angle adjusting portion 71 comes in contact with the guide groove 72 of the guide member 33 before the optical waveguides 22 get connected to the light receiving and emitting elements 32. As the open end portions 25 of the optical waveguides 22 move further closer to the light receiving and emitting elements 32, the angle adjusting portion 71 is guided by the first and second taper sides 77 and 78 of the guide member 33. In this manner, the rotation angle, on the plane perpendicular to the X direction, between the open end portions 25 of the optical waveguides 22 and the light receiving and emitting elements 32 is arranged at a predetermined position. This reduces angular misalignment, on the plane perpendicular to the X direction, of the open end portions 25 of the optical waveguides 22.

Figure 7:
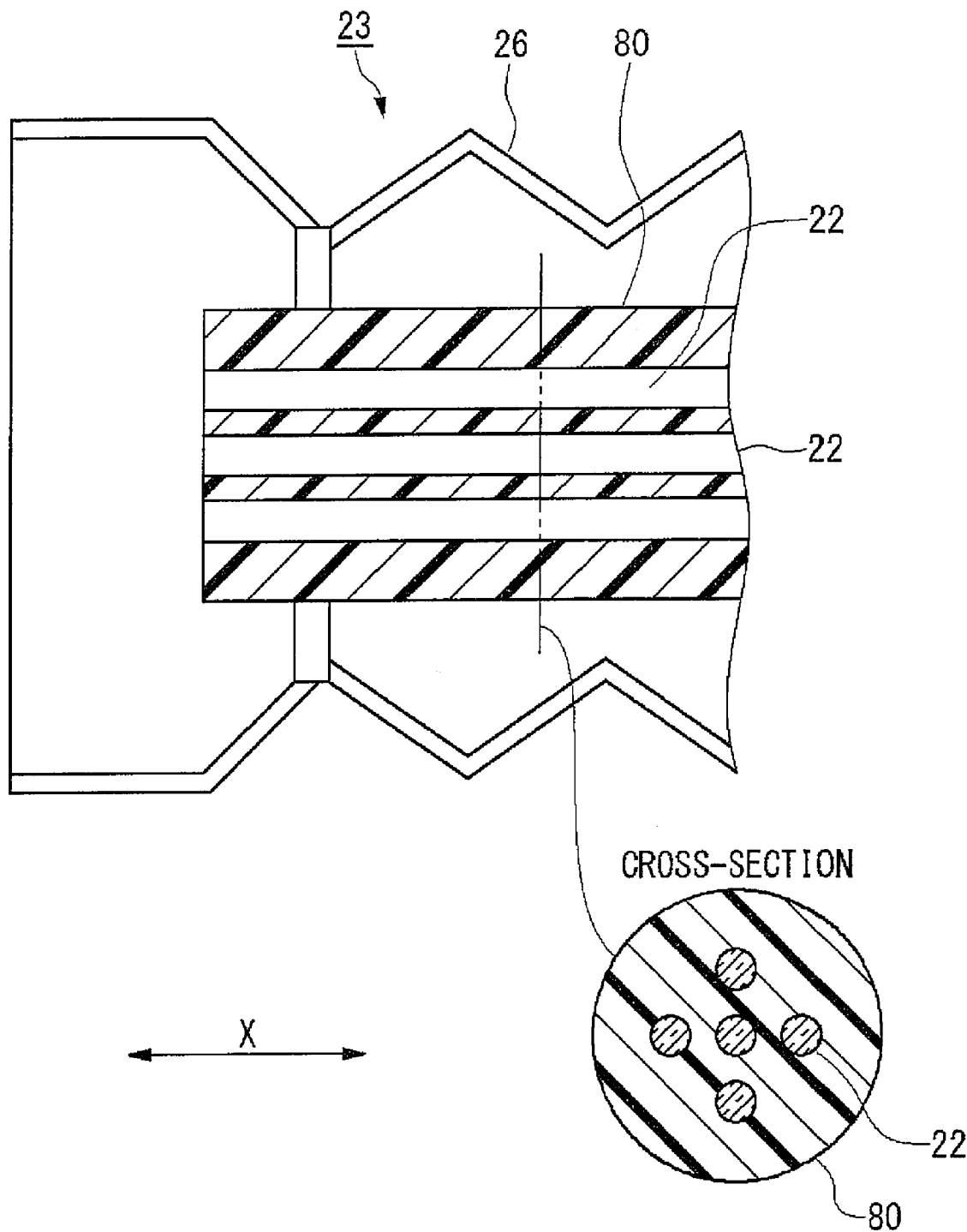
FIG. 7 illustrates a multicore cable 80 and the connecting device 23 connecting the multicore cable 80 according to a first modification example.

FIG. 7 illustrates a multicore cable 80 and the connecting device 23 connecting the multicore cable 80, relating to a first modification example of the present embodiment. Except for the multicore cable 80, the board connecting system 10 relating to the first modification example is substantially the same as the board connecting system 10 illustrated in FIG. 1. Therefore, the other constituents are not explained here.

The board connecting system 10 may include therein the multicore cable 80 that is formed by clustering one or more optical waveguides 22 with the use of a stretchable material. In this case, the moving portion 26 of the connecting device 23 houses the multicore cable 80 in the internal space 27, and moves the end portion of the multicore cable 80 in the X direction. When the board connecting system 10 uses the multicore cable 80, the plurality of optical waveguides 22 are prevented from contacting each other.

Figure 8A:
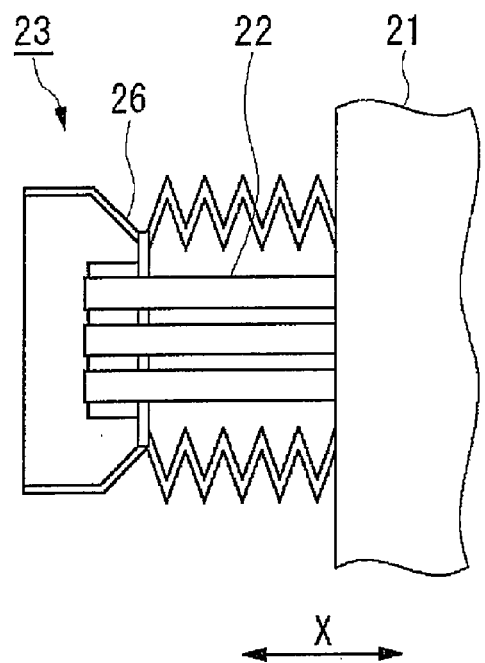
FIG. 8A illustrates the expandable and contractible optical waveguides 22 and the connecting device 23 according to a second modification example.
Figure 8B:
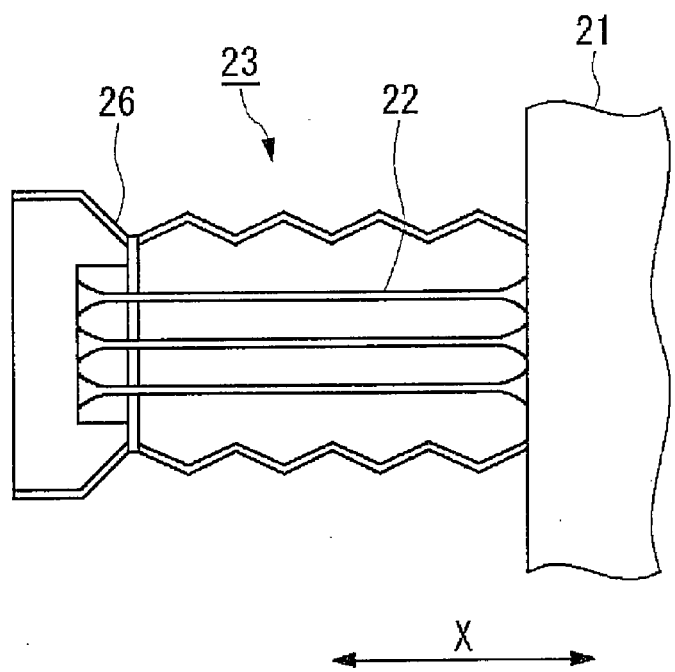
FIG. 8B illustrates the expandable and contractible optical waveguides 22 and the connecting device 23 according to the second modification example.

FIGS. 8A and 8B illustrate the optical waveguides 22 and the connecting device 23, relating to a second modification example of the present embodiment. Except for the optical waveguides 22 and the connecting device 23, the board connecting system 10 relating to the second modification example is substantially the same as the board connecting system 10 illustrated in FIG. 1. Therefore, the other constituents are not explained here.

The optical waveguides 22 may be, for example, formed by stretchable optical waveguides made of a material such as an optically-transparent resin. Such stretchable optical waveguides are made of a polymer material which is similar to rubber or the like and is transparent so as to transmit therethrough the wavelength of an optical signal to be transferred. In each stretchable optical waveguide, the refractive index is different between the core region in which the optical signal is trapped and the clad region surrounding the core region. With such a configuration, each stretchable optical waveguide transfers the optical signal based on the repetitive light reflection at the interface between the core region and the clad region. The stretchable optical waveguides can be realized by using a stretchable substance whose base material is a generally-used fluorine resin or PMMA plastic material by following a conventional optical waveguide manufacturing process or a conventional fiber manufacturing process.

Since the optical waveguides 22 are formed by using a stretchable material, the length of each optical waveguide 22 decreases and the diameter of each optical waveguide 22 increases, when the moving portion 26 of the connecting device 23 is contracted, as illustrated in FIG. 6A. On the other hand, when the moving portion 26 of the connecting device 23 is expanded, the length of each optical waveguide 22 becomes larger than when the moving portion 26 is contracted and the diameter of each optical waveguide 22 becomes smaller than when the moving portion 26 is contracted, as illustrated in FIG. 6B. The optical waveguides 22 are used for transferring light therethrough in the state of being expanded in the longitudinal direction thereof.

Being made of a stretchable material, the optical waveguides 22 do not bend but keep their straight shape even when the moving portion 26 is contracted. Therefore, the size of the internal space 27 can be reduced, resulting in reducing the size of the connecting device 23. Here, the multicore cable 80 relating to the first modification example may be formed by using the above-mentioned stretchable optical waveguides.

Figure 9A:
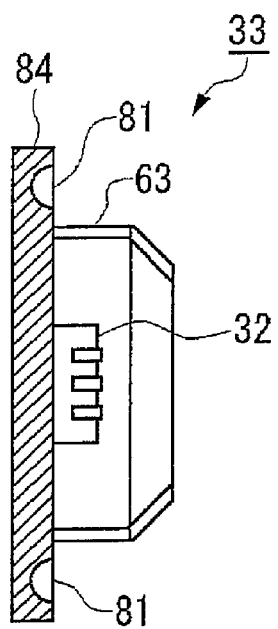
FIG. 9A is a cross-sectional view illustrating the guide member 33 having therein guide dents 81 relating to a third modification example.
Figure 9B:
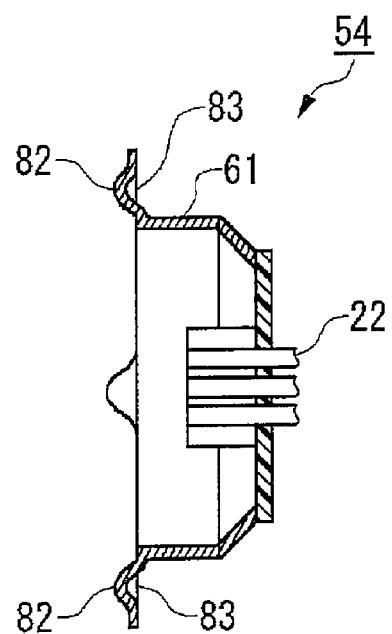
FIG. 9B is a cross-sectional view illustrating the alignment portion 54 having therein guide projections 82 relating to the third modification example.
Figure 10A:
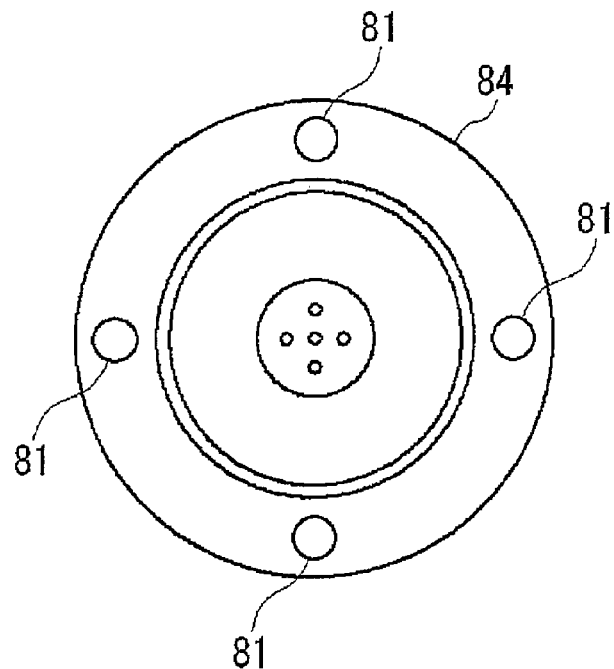
FIG. 10A is a plan view illustrating the guide member 33 having therein the guide dents 81 relating to the third modification example.
Figure 10B:
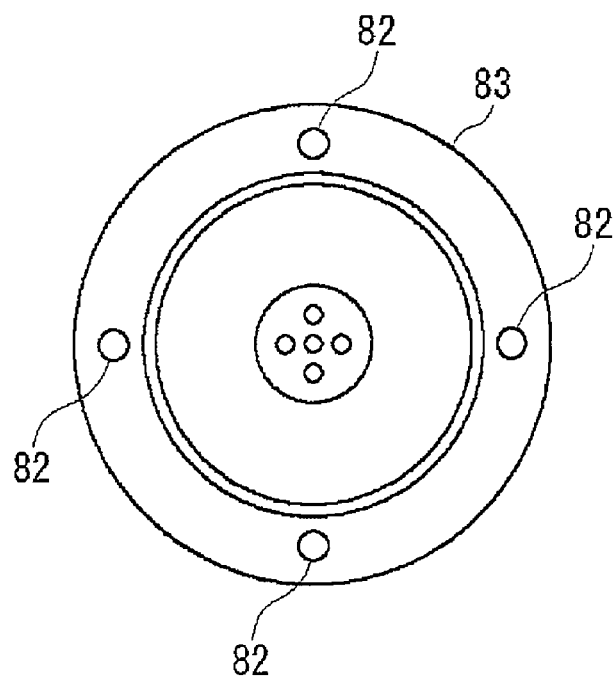
FIG. 10B is a plan view illustrating the alignment portion 54 having therein the guide projections 82 relating to the third modification example.

FIG. 9A is a cross-sectional view illustrating the guide member 33 having therein guide dents 81 relating to a third modification example of the present embodiment. FIG. 9B is a cross-sectional view illustrating the alignment portion 54 having therein guide projections 82 relating to the third modification example. FIG. 10A is a plan view illustrating the guide member 33 having therein the guide dents 81 relating to the third modification example. FIG. 10B is a plan view illustrating the alignment portion 54 having therein the guide projections 82 relating to the third modification example. Except for the guide member 33 and the alignment portion 54, the board connecting system 10 relating to the third modification example is substantially the same as the board connecting system 10 illustrated in FIG. 1. Therefore, the other constituents are not explained here.

Referring to the board connecting system 10, the guide dents 81 are provided in the guide member 33 and the guide projections 82 are provided in the alignment portion 54, when the plurality of optical waveguides 22 running in parallel are connected to the plurality of light receiving and emitting elements 32 in a one-to-one correspondence.

The guide projections 82 are formed on a circular flange portion 83. Here, the flange portion 83 is formed by bending, at right angles, the edge portion of the first cylindrical portion 61 of the alignment portion 54. The guide projections 82 are hemispherical elevations of the main surface of the flange portion 83 towards the light receiving and emitting elements 32.

The guide dents 81 are formed in a circular plate 84 whose diameter is larger than the diameter of the second cylindrical portion 63 of the guide member 33. Here, the circular plate 84 is provided at the bottom portion 52 of the second cylindrical portion 63. The guide dents 81 are hemispherical depressions of the main surface of the edge portion of the circular plate 84 which is more outside than the second cylindrical portion 63.

The guide dents 81 are formed at such positions that the guide projections 82 fit in the guide dents 81 when the moving portion 26 is completely expanded so that the alignment portion 54 is perfectly engaged with the guide member 33.

In a case where the above-described guide dents 81 and guide projections 82 are provided in the board connecting system 10, as the open end portions 25 of the optical waveguides 22 are moved closer to the light receiving and emitting elements 32, the guide projections 82 of the alignment portion 54 come in contact with the internal walls of the hemispherical guide dents 81 of the guide member 33 before the optical waveguides 22 are connected to the light receiving and emitting elements 32. As the open end portions 25 of the optical waveguides 22 are further moved closer to the light receiving and emitting elements 32, the alignment portion 54 is guided by the guide dents 81. Therefore, the rotational angle between the open end portions 25 of the optical waveguides 22 and the light receiving and emitting elements 32 is positioned at a predetermined position on the plane perpendicular to the X direction. This reduces the angular misalignment of the open end portions 25 of the optical waveguides 22 on the plane perpendicular to the X direction.

Figure 11:
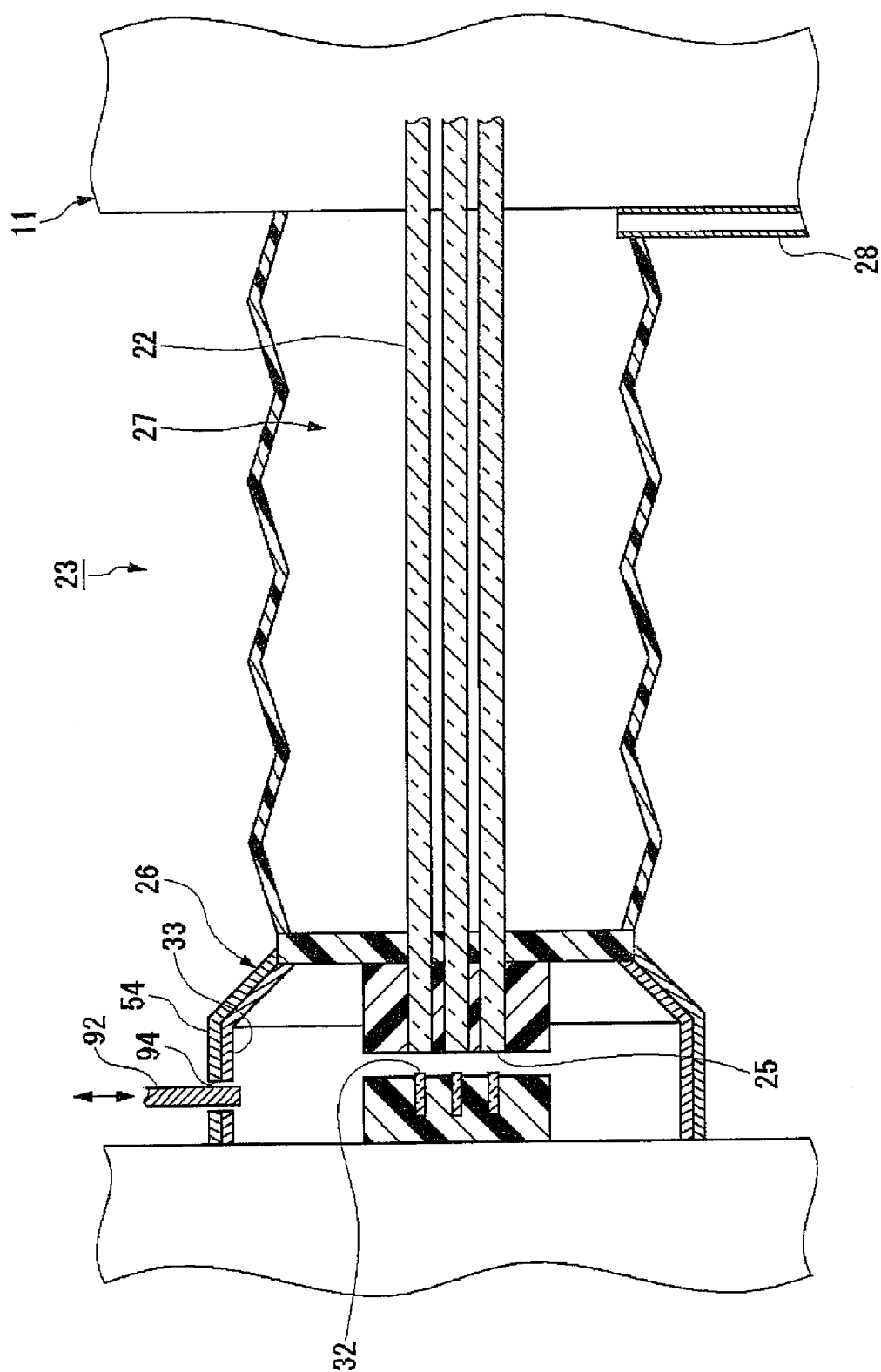
FIG. 11 illustrates the connecting device 23 provided with a fixing portion 92 relating to a fourth modification example.

FIG. 11 illustrates the board connecting system 10 provided with a fixing portion 92 relating to a fourth modification example of the present embodiment. Except for the fixing portion 92, the board connecting system 10 relating to the fourth modification example is substantially the same as the board connecting system 10 shown in FIG. 1. Therefore, the other constituents are not explained here.

The board connecting system 10 may have the fixing portion 92 that maintains the optical waveguides 22 and the light receiving and emitting elements 32 connected to each other, while the air pressure in the internal space 27 of the moving portion 26 is reduced after the optical waveguides 22 are connected to the light receiving and emitting elements 32.

For example, the fixing portion 92 is realized by a mobile pin provided in the connected circuit board 12, as illustrated in FIG. 11. When realized by a pin, the fixing portion 92 is inserted through an insertion opening 94 formed at a given position in the guide member 33 and an insertion opening 94 formed at a corresponding position in the alignment portion 54, while the guide member 33 is engaged with the alignment portion 54 with signal connection being established therebetween. Here, the vertical movement of the fixing portion 92, that is to say, inserting and extracting the fixing portion 92 into/from the insertion openings 94, is controlled by a driving mechanism. When inserted into the insertion openings 94, the fixing portion 92 can maintain the optical waveguides 22 and the light receiving and emitting elements 32 connected to each other.

According to the above-described board connecting system 10, the fixing portion 92 can prevent vibration or the like from cutting off the connection between the optical waveguides 22 and the light receiving and emitting elements 32.

Figure 12:
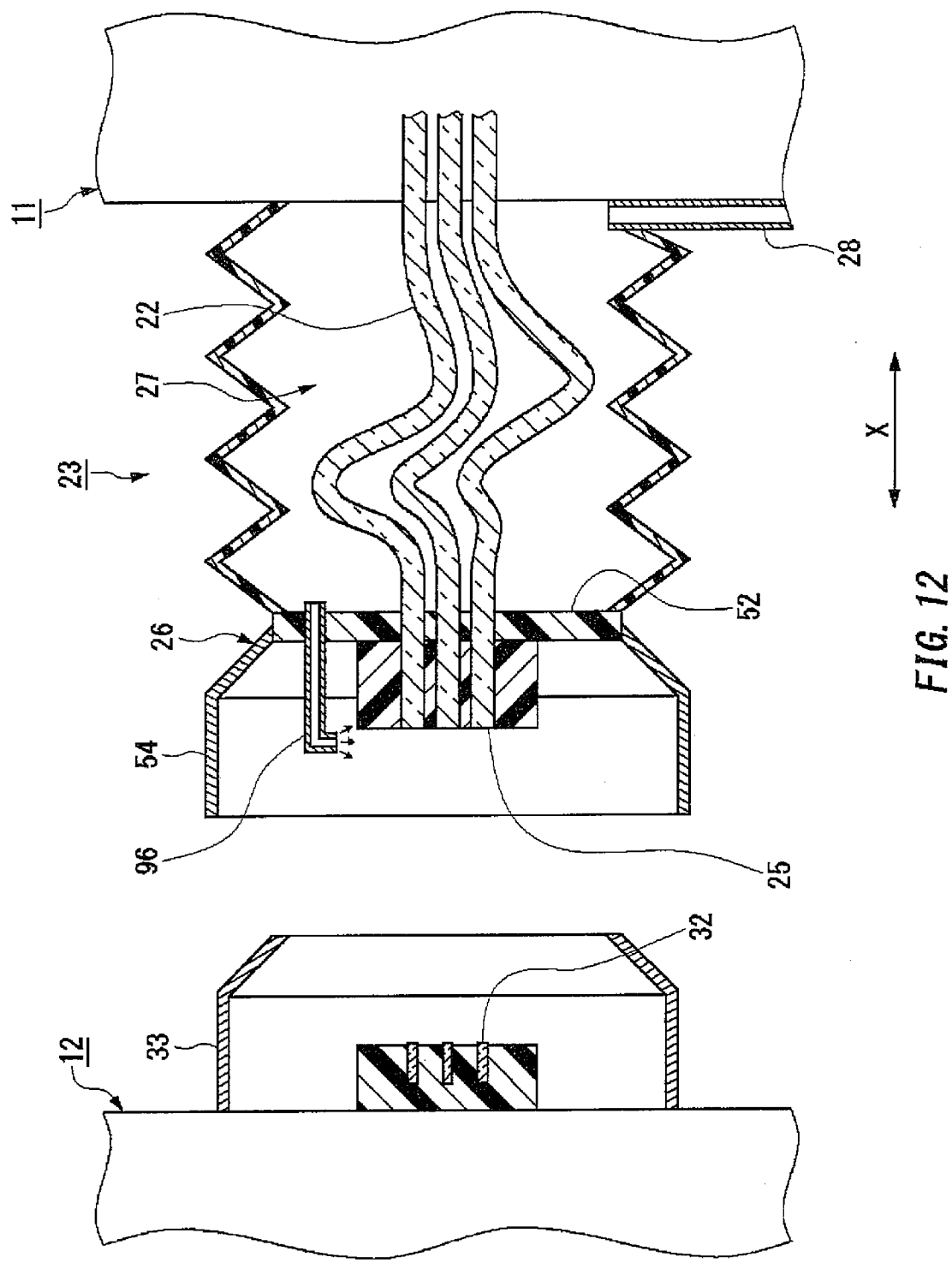
FIG. 12 illustrates the connecting device 23 provided with a cleaning portion 96 relating to a fifth modification example.

FIG. 12 illustrates the connecting device 23 provided with a cleaning portion 96 relating to a fifth modification example of the present embodiment. Except for the cleaning portion 96, the board connecting system 10 relating to the fifth modification example is substantially the same as the board connecting system 10 illustrated in FIG. 1. Therefore, the other constituents are not explained here.

The moving portion 26 of the connecting device 23 may include the cleaning portion 96 that cleans the connection portions of the light emitting and receiving elements 32 and the open end portions 25, by expelling the gas in the internal space 27 to the light emitting and receiving elements 32, while the air pressure inside the internal space 27 is higher than the outside pressure in order to move the open end portions 25 of the optical waveguides 22 closer to the light receiving and emitting elements 32.

For example, the cleaning portion 96 is realized by a nozzle provided at the bottom portion 52, as illustrated in FIG. 12. When the cleaning portion 96 is realized by a nozzle, one end portion is connected to the internal space 27 and the opening of the other end portion is directed towards the connection portions of the light receiving and emitting elements 32 and the open end portions 25. Here, the diameter of the cleaning portion 96 is sufficiently smaller than the diameter of the air inlet tube 28. With such a configuration, the cleaning portion 96 expels the air in the internal space 27 out as the air pressure inside the internal space 27 increases. Which is to say, when the open end portions 25 of the optical waveguides 22 are moved closer to the light receiving and emitting elements 32, the cleaning portion 96 can expel the air to the connection portions of the light receiving and emitting elements 32 and the open end portions 25 to clean the connecting portions.

While the embodiment of the present invention has been described, the technical scope of the invention is not limited to the above described embodiment. It is apparent to persons skilled in the art that various alterations and improvements can be added to the above-described embodiment. It is also apparent from the scope of the claims that the embodiment added with such alternations or improvements can be included in the technical scope of the invention.

What is claimed is:

1. A connecting device for connecting a signal transfer path to a connection target component in such a manner that a signal is capable of being transferred therebetween, the connecting device comprising:
   the signal transfer path that is to be connected to the connection target component; and
   a moving portion that has therein a sealed space, the moving portion moving an end portion of the signal transfer path closer to the connection target component so that the end portion is connected to the connection target component with signal transfer being possible therebetween in response to an increase in a pressure of a gas in the sealed space of the moving portion, the moving portion moving the end portion away from the connection target component in response to a decrease in the pressure in the sealed space of the moving portion,
   wherein the signal transfer path is an optical waveguide, and
   the moving portion moves the end portion of the optical waveguide closer to the connection target component in response to the increase in the pressure within the sealed space of the moving portion, so that the end portion of the optical waveguide and the connection target component are optically connected to each other.

2. The connecting device as set forth in claim 1, wherein the moving portion holds, within the sealed space, a portion of the signal transfer path which has a predetermined length and contains the end portion of the signal transfer path.

3. The connecting device as set forth in claim 1, wherein the moving portion moves the end portion of the signal transfer path in a direction towards the connection target component, by expanding or contracting in response to the pressure within the sealed space of the moving portion.

4. The connecting device as set forth in claim 3, wherein the moving portion is hollow and shaped like an accordion.

5. The connecting device as set forth in claim 1, wherein the moving portion moves the end portion of the optical waveguide closer to the connection target component in response to the increase in the pressure within the sealed space of the moving portion, so that the end portion of the optical waveguide and the connection target component are optically connected to each other without contacting each other.

6. The connecting device as set forth in claim 1, wherein the moving portion moves the end portion of the optical waveguide closer to the connection target component in response to the increase in the pressure within the sealed space of the moving portion, so that the end portion of the optical waveguide and the connection target component are optically connected to each other by using a connector.

7. The connecting device as set forth in claim 1, comprising a multicore cable that is formed by clustering together a plurality of optical waveguides by using a stretchable material,
   wherein the moving portion moves one or more of a plurality of end portions of the plurality of optical waveguides in the multicore cable in a direction towards the connection target component.

8. The connecting device as set forth in claim 1, wherein the optical waveguide is formed by using a stretchable material, and
   the moving portion moves the end portion of the optical waveguide closer to the connection target component by expanding the optical waveguide, in order that the end portion is connected to the connection target component.

9. The connecting device as set forth in claim 1, further comprising
   an alignment portion that (i), when the end portion of the signal transfer path is moved closer to the connection target component, comes in contact with a guide member provided on an apparatus including therein the connection target component before the signal transfer path is connected to the connection target component, and (ii), as the end portion of the signal transfer path is further moved closer to the connection target component, is guided by the guide member, thereby reducing misalignment of the end portion of the signal transfer path on a plane perpendicular to a direction in which the end portion of the signal transfer path is moved closer to or away from the connection target component.

10. The connecting device as set forth in claim 1, wherein the moving portion is configured so as to connect a plurality of signal transfer paths running in parallel to each other with a plurality of connection target components in a one-to-one correspondence, and
the connecting device further comprises
an angle adjusting portion that (i), when end portions of the plurality of signal transfer paths are moved closer to the plurality of connection target components, comes in contact with a guide member that is provided on an apparatus including therein the plurality of connection target components before the plurality of signal transfer paths are connected to the plurality of connection target components in a one-to-one correspondence and (ii), as the end portions of the plurality of signal transfer paths are further moved closer to the plurality of connection target components, is guided by the guide member, thereby reducing angular misalignment of the end portions of the plurality of signal transfer paths on a plane perpendicular to a direction in which the end portions of the plurality of signal transfer paths are moved closer to or away from the plurality of connection target components.

11. The connecting device as set forth in claim 1, further comprising
a fixing portion that maintains the signal transfer path and the connection target component connected to each other, while the pressure inside the sealed space of the moving portion is reduced after the signal transfer path is connected to the connection target component.

12. The connecting device as set forth in claim 1, wherein the moving portion includes
a cleaning portion that cleans a connection portion of the connection target component by expelling a gas inside the moving portion to the connection target component while the pressure inside the sealed space of the moving portion is higher than an outside pressure in order to move the end portion of the signal transfer path closer to the connection target component.

13. A connecting system comprising:
a connecting apparatus that includes (i) a signal transfer path that transfers an optical signal and (ii) a connecting device that connects the signal transfer path to a connection target component in such a manner that a signal is capable of being transferred therebetween; and
a connected apparatus that includes the connection target component to be connected to the signal transfer path, the connecting device including
a moving portion that has therein a sealed space, the moving portion moving an end portion of the signal transfer path closer to the connection target component so that the end portion of the signal transfer path is connected to the connection target component in response to an increase in a pressure of a gas within the sealed space of the moving portion, the moving portion moving the end portion away from the connection target component in response to a decrease in the pressure within the sealed space of the moving portion,
wherein the signal transfer path is an optical waveguide, and
the moving portion moves the end portion of the optical waveguide closer to the connection target component in response to the increase in the pressure within the sealed space of the moving portion, so that the end portion of the optical waveguide and the connection target component are optically connected to each other.

14. The connecting system as set forth in claim 13, wherein the connecting apparatus and the connected apparatus are circuit boards having electric circuits formed therein, and the circuit boards are mounted on the connecting system in parallel to each other, and
the moving portion moves the end portion of the signal transfer path closer to one of the circuit boards which corresponds to the connected apparatus by moving the end portion of the signal transfer path in a direction perpendicular to the circuit boards in response to the increase in the pressure within the sealed space of the moving portion, so as to connect the end portion of the signal transfer path to the connection target component in such a manner that a signal is capable of being transferred therebetween.

15. The connecting system as set forth in claim 14, further comprising
a backplane that includes a first backplane (BP) connector and a second BP connector, the first BP connector to be connected to a board connector provided on a side of one of the circuit boards which corresponds to the connecting apparatus, the second BP connector to be connected to a board connector provided on a side of one of the circuit boards which corresponds to the connected apparatus,
wherein the backplane supplies a gas supplied thereto from a source outside the connecting system, to the moving portion included in one of the circuit boards which corresponds to the connecting apparatus, via the first BP connector.

16. The connecting system as set forth in claim 13, further comprising
a pressure control section that controls the pressure within the sealed space of the moving portion.

17. A connecting method for connecting a signal transfer path to a connection target component in such a manner that a signal is capable of being transferred therebetween, the signal transfer path being an optical waveguide, the connecting method comprising:
moving an end portion of the signal transfer path closer to the connection target component so that the end portion of the signal transfer path is connected to the connection target component, so that the end portion of the optical waveguide and the connection target component are optically connected to each other, by increasing a pressure of a gas within a sealed space in a moving portion; and
moving the end portion away from the connection target component by decreasing the pressure within the sealed space of the moving portion.

18. A connecting device for connecting a signal transfer path to a connection target component in such a manner that a signal is capable of being transferred therebetween, the connecting device comprising:
the signal transfer path that is to be connected to the connection target component;
a moving portion that has therein a sealed space, the moving portion moving an end portion of the signal transfer path closer to the connection target component so that the end portion is connected to the connection target component with signal transfer being possible therebetween in response to an increase in a pressure in the moving portion, the moving portion moving the end portion away from the connection target component in response to a decrease in the pressure in the moving portion; and a fixing portion that maintains the signal transfer path and the connection target component connected to each other, while the pressure inside the moving portion is reduced after the signal transfer path is connected to the connection target component, wherein the signal transfer path is an optical waveguide, and the moving portion moves the end portion of the optical waveguide closer to the connection target component in response to the increase in the pressure within the moving portion, so that the end portion of the optical waveguide and the connection target component are optically connected to each other.

19. A connecting device for connecting a signal transfer path to a connection target component in such a manner that a signal is capable of being transferred therebetween, the connecting device comprising:

the signal transfer path that is to be connected to the connection target component; and a moving portion that has therein a sealed space, the moving portion moving an end portion of the signal transfer path closer to the connection target component so that the end portion is connected to the connection target component with signal transfer being possible therebetween in response to an increase in a pressure in the moving portion, the moving portion moving the end portion away from the connection target component in response to a decrease in the pressure in the moving portion, wherein the signal transfer path is an optical waveguide, and the moving portion moves the end portion of the optical waveguide closer to the connection target component in response to the increase in the pressure within the moving portion, so that the end portion of the optical waveguide and the connection target component are optically connected to each other, and wherein the moving portion includes a cleaning portion that cleans a connection portion of the connection target component by expelling a gas inside the moving portion to the connection target component while the pressure inside the moving portion is higher than an outside pressure in order to move the end portion of the signal transfer path closer to the connection target component.

20. A connecting system comprising:

a connecting apparatus that includes (i) a signal transfer path that transfers an optical signal and (ii) a connecting device that connects the signal transfer path to a connection target component in such a manner that a signal is capable of being transferred therebetween;

a connected apparatus that includes the connection target component to be connected to the signal transfer path, the connecting device including a moving portion that has therein a sealed space, the moving portion moving an end portion of the signal transfer path closer to the connection target component so that the end portion of the signal transfer path is connected to the connection target component in response to an increase in a pressure within the moving portion, the moving portion moving the end portion away from the connection target component in response to a decrease in the pressure within the moving portion; and a backplane that includes a first backplane (BP) connector and a second BP connector, the first BP connector to be connected to a board connector provided on a side of one of the circuit boards which corresponds to the connecting apparatus, the second BP connector to be connected to a board connector provided on a side of one of the circuit boards which corresponds to the connected apparatus, wherein the signal transfer path is an optical waveguide, wherein the moving portion moves the end portion of the optical waveguide closer to the connection target component in response to the increase in the pressure within the moving portion, so that the end portion of the optical waveguide and the connection target component are optically connected to each other, wherein the connecting apparatus and the connected apparatus are circuit boards having electric circuits formed therein, and the circuit boards are mounted on the connecting system in parallel to each other, wherein the moving portion moves the end portion of the signal transfer path closer to one of the circuit boards which corresponds to the connected apparatus by moving the end portion of the signal transfer path in a direction perpendicular to the circuit boards in response to the increase in the pressure within the moving portion, so as to connect the end portion of the signal transfer path to the connection target component in such a manner that a signal is capable of being transferred therebetween, and wherein the backplane supplies a gas supplied thereto from a source outside the connecting system, to the moving portion included in one of the circuit boards which corresponds to the connecting apparatus, via the first BP connector.

* * * * *